United States Patent
Richtsmeier et al.

(10) Patent No.: US 11,829,661 B2
(45) Date of Patent: Nov. 28, 2023

(54) MEDIA FEED RATE ADJUSTMENTS

(71) Applicant: HEWLETT-PACKARD DEVELOPMENT COMPANY, L.P., Spring, TX (US)

(72) Inventors: Dean J. Richtsmeier, Boise, ID (US); Brian C. Mayer, Boise, ID (US); Kenneth Scott Line, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/794,221

(22) PCT Filed: Apr. 21, 2020

(86) PCT No.: PCT/US2020/029092
§ 371 (c)(1),
(2) Date: Jul. 20, 2022

(87) PCT Pub. No.: WO2021/216045
PCT Pub. Date: Oct. 28, 2021

(65) Prior Publication Data
US 2023/0048894 A1 Feb. 16, 2023

(51) Int. Cl.
*G06F 3/12* (2006.01)
(52) U.S. Cl.
CPC .......... *G06F 3/1229* (2013.01); *G06F 3/121* (2013.01); *G06F 3/128* (2013.01)

(58) Field of Classification Search
None
See application file for complete search history.

(56) References Cited

U.S. PATENT DOCUMENTS

| | | | |
|---|---|---|---|
| 5,642,288 A | 6/1997 | Leung et al. | |
| 5,848,784 A | 12/1998 | Tranquilla | |
| 6,693,723 B2* | 2/2004 | Keithley | H04N 1/393 358/1.2 |
| 6,960,036 B1 | 11/2005 | Fujita et al. | |
| 7,383,016 B2 | 6/2008 | Lee et al. | |
| 7,914,216 B2 | 3/2011 | Yasue et al. | |
| 8,849,146 B2 | 9/2014 | Campbell et al. | |
| 9,098,031 B2 | 8/2015 | Cao et al. | |
| 2002/0181002 A1* | 12/2002 | Leyva | G06F 3/1204 358/1.15 |
| 2007/0019061 A1 | 1/2007 | Koyabu et al. | |
| 2009/0116746 A1 | 5/2009 | Neogi et al. | |
| 2018/0290468 A1* | 10/2018 | Orue | B41J 15/16 |

\* cited by examiner

*Primary Examiner* — Dov Popovici
(74) *Attorney, Agent, or Firm* — Brooks, Cameron & Huebsch, PLLC

(57) ABSTRACT

An example system may include a processor and a non-transitory machine-readable storage medium storing instructions executable by the processor to determine, during an imaging operation by an imaging component of a printing device, whether a print queue, supplied by the imaging component, will be depleted by a printing component of the printing device prior to a completion of the imaging operation; and adjust, based on the determination, a media feed rate of the printing component.

15 Claims, 4 Drawing Sheets

MEDIA FEED RATE ADJUSTMENTS

BACKGROUND

A printing device may be utilized to generate physical instantiations of electronic data, For example, a printing device may include a printing component to print, based on a digital representation of a page, a physical copy of the page on a print medium. In some examples, a printing device may include an imaging component. An imaging component may generate digital representations of physical objects. The printing component of the printing device may print the digital representations generated by the imaging component of the printing device.

DETAILED DESCRIPTION

Figure 1:
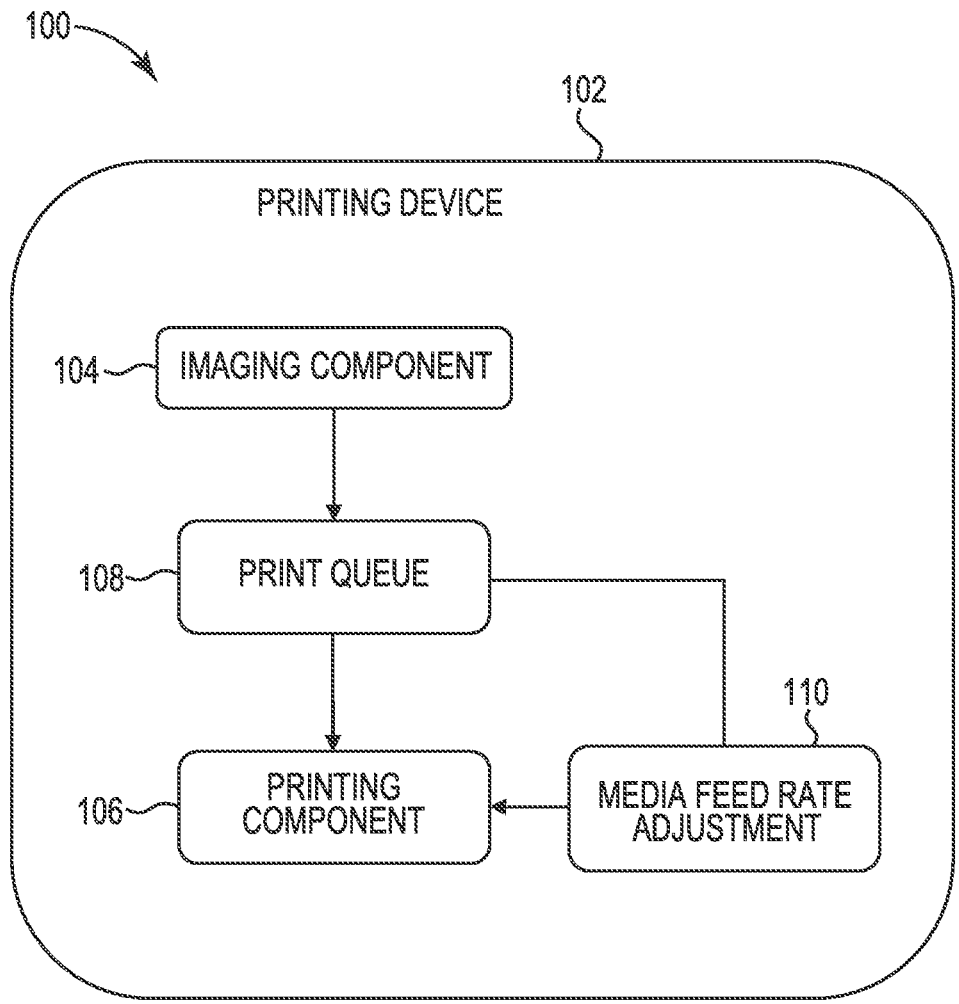
FIG. 1 illustrates an example of a system for media feed rate adjustments consistent with the present disclosure.

A printing device may utilize a printing component to perform a printing operation. Performing a printing operation may include printing a physical instantiation of electronic data. For example, performing a printing operation may include operating a printing component to transfer a printing substance (such as a printing fluid, a printing powder, a printing gel, etc.) from a reservoir to a print medium (such as paper, products, cloth, plastics, etc.), Performing a printing operation with the printing component may include transferring printing substance from the reservoir to the print medium in order to generate a physical instantiation according to a digital representation of the image.

The printing component may perform a printing operation at a particular print speed. For example, the printing component may be operated to generate and/or output printed print medium at a particular rate. For example, the printing component may output a particular amount of printed print medium units per unit of time. For example, a printing component may generate and/or output printed print medium at a rate of sixty pages of printed print medium per minute.

The printing device may also include an imaging component. The imaging component may perform an imaging operation. Performing an imaging operation may include generating digital representations of a physical object by imaging the physical object. For example, the imaging component may optically scan a physical document and covert the optical inputs collected during the scan to digital representations of the document. That is, the imaging component may generate a digital representation of an image of a scanned document that may be utilized as a set of instructions to print the image.

The imaging component may perform imaging operations at a particular imaging speed. For example, the imaging component may be operated to scan physical pages and convert them to digital representations of the physical pages at a particular rate. For example, the printing component may scan physical pages and convert them to digital representations of the physical pages at a particular amount of pages per unit of time. For example, an imaging component may generate and/or output digital representations of scanned objects at a rate of thirty scanned pages per minute.

In some examples, the imaging component of a printing device may perform the imaging operations at a first speed. The printing component of the printing device may perform printing operations at a second speed. The first speed and the second speed may be different speeds.

For example, the printing component may perform printing operations at a second speed that is greater than the first speed at which the imaging component is performing imaging operations. That is, the imaging component may generate digital representations of pages at a first speed and the printing component may print physical copies of the digital representations at a second speed that is faster than the first speed. As such, the printing component may print physical copies of digital representations of pages of data faster than an imaging component can generate additional digital representations of pages of data to be printed by the printing component.

Performing printing operations with a printing component may involve triggering performance of an engaging cycle at the printing component. Performing an engaging cycle may include engaging mechanical and electrical components of the printing component to prepare for printing. For example, a printing component may include printer engine including the mechanical and/or electrical components that physically perform the transfer of a printing substance to a substrate. An operating condition at such mechanical and/or electrical components may have to reach a threshold level prior to begin the transfer of a printing substance to a print medium.

As used herein, an operating condition may include a temperature, an amount of movement, an amount and/or localization of an electrical charge, a positioning of components relative to one another, etc. As used herein, generating the operating conditions may include increasing the temperature of various components of the printing component to a threshold temperature, initiating movement and/or increasing movement velocity of various components of the printing component to a threshold amount of movement, increasing an amount of electrical charge and/or its localization at various components of the printing component to a threshold amount of electrical charge, modifying the position of various components of the printing component relative to one another to achieve a threshold proximity. The aforementioned threshold levels may be the threshold levels involved in generating a printed unit of print medium. As such, performing an engaging cycle may include engaging the mechanical and electrical components to achieve the generate the threshold operating conditions involved in completing the printing operation.

Generating and/or sustaining the threshold operating conditions at the printing component may cause wear to the printing component. For example, mechanical erosion, overheating, electrical shorting, etc. may result from the sustained heat, movement, electrical charging, etc. over time. Eventually, degradation, damage, and/or failure may occur within the printing component.

To prolong the life of the printing component, a disengaging cycle may be triggered at the printing component to return the operating conditions from their engaged threshold levels associated with active printing to levels not associated with active printing. In some examples, a disengaging cycle may involve a reduction in the operating conditions associated with active printing. For example, a disengaging cycle may be triggered at the printing component to dissipate the heat, movement, electrical charge/localization, component proximity, etc.

For example, if a printing component is not actively performing a printing operation (for example, if the printing component is waiting more than a threshold amount of time for a next digital representation of a page of data to be provided to print) the printing component may disengage its mechanical and/or electrical components. For example, the printing component may dissipate and/or discontinue the heating, moving, electrical charging, component proximity modification, etc. associated with the active printing at the mechanical and electrical components. Disengaging the mechanical and/or electrical components may prevent the printing component from performing any further printing during the period over which the operating conditions at the mechanical and electrical components are dissipated and/or discontinued. That is, the printing component may be in an idle state with respect to printing while it is completing a disengaging cycle.

In order to resume printing, the mechanical and electrical components may be re-engaged. For example, the operating conditions may be reestablished at the mechanical and/or electrical components of the printing component to resume active printing. During the period that the operating conditions are being established at the mechanical and electrical components of the printing component, the printing component may be prevented from performing any further printing within the period. That is, the printing component may be in an idle state with respect to printing while it is completing a re-engaging cycle. Once the operating conditions again reach their respective threshold levels in the printing component, then active printing may be resumed.

The engaging, disengaging, and re-engaging cycles may, in some examples, be triggered at the printing component over the course of printing data supplied by an imaging operation. For example, the imaging component may be scanning objects to generate digital representations thereof to be printed by a printing component. The imaging component may generate and/or provide the digital representations to the printing component to be printed on print medium. The printing component, upon receiving, for example, the first digital representation from the imaging component may trigger an engagement cycle to bring its component up to the operating temperature, movement, electrical charge, etc. involved in printing the first digital representations. As described above, the printing component may be idle with respect to printing while completing the aforementioned cycles. As such, the imaging component may be given a head start with respect to generating additional digital representations for printing while the operating conditions of the printing component are brought to their respective threshold levels.

However, as may be the case in some examples, the imaging component may be imaging at a first rate while the printing component may, once it has completed the engagement cycle, be printing at a second rate. The second rate may be faster than the first rate. As such, in larger imaging operations involving imaging multiple object to generate multiple corresponding digital representations, all existing digital representations may be printed and/or the printing component may, due to the rate differential, be waiting for the arrival of a next digital representation to be printed. In such examples, the printing component may be waiting for a next digital representation to be printed for a period of time that exceeds a threshold period of time associated with disengagement cycle triggering.

As a result, a disengagement cycle may be triggered at the printing component. As such, the mechanical and electrical components of the printing component may be disengaged while waiting for the operating conditions to dissipate from their threshold levels. Then, once the next digital representation to be printed is completed by the imaging component, a re-engagement cycle may be triggered at the printing component causing the mechanical and electrical components of the printing component to be re-engaged to re-achieve the operating condition threshold in order to resume printing.

As described above, the period of time during completion of the disengagement cycle and/or the re-engagement cycle results in an observable pause in the ability of the printing component to generate and/or output printed print medium pages. Observing this behavior may frustrate users who may perceive the pause as a deficiency of the printing component and/or the printing device. That is, a user may perceive that the printing device is slow and/or malfunctioning due to repeated pauses in printing.

Further, as described above, the delay to the arrival of a next digital representation to be printed at the printing component may result from the speed differential and may trigger the disengagement cycle and/or the re-engagement cycle at the printing component during an imaging operation. Multiple delays may occur over the course of printing digital representations during an imaging operation involving multiple digital representations. As such, multiple disengagement and re-engagement cycles may be triggered during the imaging operation.

The disengagement and re-engagement cycles may produce wear that may result in the degradation, damage, and/or failure of mechanical and electrical components of the printing component, similar to the active printing operations of the printing component. However, the disengagement and re-engagement cycles may be non-productive in that they are not directly involved in the active printing of print medium, but rather are involved in preparing the printing component to actively print from an inactive state and/or returning the printing component from active printing to an inactive state. As such, the resulting wear may be considered non-productive wear as compared to the wear produced when actively printing at the printing component. The non-productive wear introduced in these circumstances may cause premature degradation, damage, and/or failure of the printing component relative to an expected amount of units of print media that the printing component may print over its expected lifespan.

In order to avoid the repetitive disengagement and re-engagement cycles, a relatively faster imaging component may be included in the printing device. For example, the printing device may include an imaging device that generates digital representations of objects at a higher rate that is more closely matched to a printing rate of a printing component of the printing device. However, imaging components that achieve imaging rates having parody to printing rates may be relatively expensive components. As such, the incorporation of such relatively high-speed imaging components into the printing device may increase the manufacturing costs and/or the price charged for the printing device.

Alternatively, a printing component may be utilized having a relatively slower printing speed that more closely matches an imaging speed of the slower imaging component in the printing device. However, a printing component having a relatively slower printing speed will output printed print medium at the slower speed regardless of whether it is awaiting generation of a next digital representation of a page to be printed, if it already has additional digital representations of pages ready and waiting to be printed, and/or if it is receiving digital representations at a faster rate from a data source other than the imaging component (e,g., such as from a communicatively couple computing device). Consumers may make purchasing decisions based on a printing speed of a printing component. As such, the relatively slower printing speed may lead some consumers to not consider purchasing the printing device.

In some examples, in order to avoid triggering repetitive disengagement and re-engagement cycles during an imaging operation, a period of time consumed by the disengagement cycle and/or re-engagement cycles occur may be extended. For example, the disengagement cycle may be prolonged by extending the amount of time over which the operating conditions associated with active printing are dissipated from their respective threshold levels. For example, the rate of dissipation of the operating conditions may be retarded to extend the disengagement cycle. The re-engagement cycle may be prolonged by extending the amount of time over which the operating conditions are ramped up to their respective thresholds for active printing. For example, a rate at which operating conditions are built-up may be retarded to prolong the re-engagement cycle.

As a result, the delay between a time that the printing component has run out of additional digital representations of pages to be printed and a time at which the printing component is able to resume printing upon receiving a next digital representation of a page of data to be printed may be extended. Therefore, a period of time within which an imaging component has an opportunity to generate additional digital representations of pages before a printing component is ready to resume printing the digital representation is extended.

However, the printing component may be subject to excess wear as a result of the extended re-engagement cycle and/or disengagement cycle. Further, the extended re-engagement cycle and/or disengagement cycle may slow the printing process regardless of whether it is awaiting generation, by an imaging component, of a next digital representation of a page to be printed or if it already has additional digital representations of pages ready and waiting to be printed. Furthermore, extending the re-engagement cycle and/or disengagement cycle may provide some additional time for the imaging component to generate a next digital representation of a page, but the amount of time may not be enough to resolve the repetitive re-engagement and/or disengagement cycles when imaging numerous pages.

In contrast, examples consistent with the present disclosure may include a mechanism to preserve an unconstrained first page out printing speed to maintain a rapid first page out printing experience. Additionally, the examples may avoid repetitive triggering of re-engagement and/or disengagement cycles during an imaging operation while preserving the ability to rapidly complete re-engagement and/or disengagement cycles when triggered. Further, the examples may avoid excess wear of the printing component by pacing a printing component through media feed rate adjustments. Examples consistent with the present disclosure may include a system including a processor and a non-transitory machine-readable storage medium to store instructions executable by the processor to: determine, during an imaging operation by an imaging component of a printing device, whether a print queue, supplied by the imaging component, will be depleted by a printing component of the printing device prior to a completion of the imaging operation; and adjust, based on the determination, a media feed rate of the printing component.

FIG. 1 illustrates an example of a system 100 for media feed rate adjustments consistent with the present disclosure. The described components and/or operations of the system 100 may include and/or be interchanged with the described components and/or operations described in relation to FIG. 2-FIG. 4.

The system 100 may include a printing device 102. The printing device 102 may include a printer such as a multi-function printer. The printing device 102 may include a printer that includes multiple components to perform multiple functions (e.g., printing, imaging, copying, faxing, etc.). In some examples, the printing device 102 may include a printing component 106 and an imaging component 104.

The printing device 102 may include an inkjet printer, a laser printer, a three-dimensional (3D) printer, etc. The printing component 106 may include a printer engine. A printer engine may include the mechanical and/or electrical components that physically perform the transfer a printing substance to a substrate.

For example, the printing component 106 may include a print medium supply tray to hold unprinted print medium. The printing component 106 may include print medium pick-up components that pick-up units (e.g., sheets, pages, etc.) of print medium from the supply tray. For example, the printing component 106 may include grabbing mechanisms, rollers, guides, etc. to pick-up print medium from a stack of print medium.

The printing component 106 may include a print medium feeding component. The print medium feeding component may include conveying mechanisms such as rollers, belts, guides etc. to convey the print medium along a print medium feed path. For example, the print medium conveying component may convey print medium from the supply tray of the printing component, through a printing substance transferring component of the printing component, and out to an output tray of the printing component.

The printing component 106 may include a printing substance transferring component. For example, the printing device 102 may be a laser printer that prints images on print media utilizing an electrostatic digital printing process. As such, the printing component 106 may include an assembly to pass a laser beam back and forth over a charged cylinder (e.g., drum) to define a differentially charged image on the cylinder to selectively collect and transfer an electrically charged printing substance to the print medium. The printing component 106 may include a fuser assembly to heat the print medium and permanently fuse the printing substance to the print medium. After having been processed through the fuser assembly, the print medium may be considered printed print media that bares the target image defined by digital representations stored in the printing device 102 (e.g., at print queue 108).

The printing component 106 may include an output component. The output component may include an assembly to convey the printed print medium from the fuser assembly to an output tray. The printed print medium may be retrieved from the output tray.

As described above, performing a printing operation (e.g., printing an image corresponding to a digital representation on a unit of print medium) may include triggering an engaging cycle for the printing component 106. As described above, triggering the engaging cycle may include modifying operating conditions at the printing component 106 to reach threshold levels associated with active printing.

For example, a charge may be applied to and/or built up on the charged cylinder. A laser may be powered up to a full intensity level. Further, the charged cylinder, rollers, a scanning mirror, etc. may be spun-up or rotated until they reach a threshold speed. Furthermore, the fuser assembly may be heated to a fusing temperature. Once the corresponding charge levels, rotation speeds, and/or temperatures have been achieved, the printing component 106 may proceed with transferring the image, described by the digital representation, to the print medium by transferring printing substance in the manner outlined above. That is, once the operating conditions have achieved their threshold levels the printing component 106 may begin active printing, Sustaining the operating conditions at or beyond their threshold levels associated with active printing may, over the course time, cause wear and/or damage to the printing component 106. For example, the rotation of components of the printing component 106 may produce stress, strain, and/or wear to the printing component 106 and/or other components of the printing device 102. Further, heating of components of the printing component 106 may produce stress, strain, and/or wear to the printing component 106 and/or other components of the printing device 102.

This stress, strain, and/or wear to the printing component 106 may be an expected byproduct of generating printed print medium via the printing component 106. However, the stress, strain, and/or wear to the printing component 106 may be avoided when the printing component is not actively printing on print medium.

For example, the printing component 106 may print an image (e.g., of characters, graphics, shapes, tones, colors, densities, patterns, etc.) on printing medium according to a set of digital instructions. For example, a printing device 102 may include a print queue 108. A print queue 108 may include a non-transitory machine-readable medium for storing instructions executable by a controller to cause the printing component 106 to transfer printing substance to a print medium in a manner specified by the instructions. For example, the print queue 108 may include a buffer where pages of data are stored that specify instructions for transferring printing substance to a print medium to achieve a target image on the printing medium.

A page of data may include a digital representation of the target image to be printed on the print medium. The term "page of data" in this context may refer to a distinct block of data within the print queue 108. In some examples, the page of data may correspond to a specific unit of print medium. That is, a page of data may include the digital representation of a target image to be reproduced on a corresponding page unit (e.g., a physical page, sheet, roll, product, packaging, etc.) of print medium. However, as used herein, the term "page of data" may, in some examples, not be limited to an amount of data corresponding to any one particular page unit, size, or form of print medium. Rather, the "page of data" may refer, in some examples, to a unit of data executable to perform a particular run of printing at the printing component 106. Likewise, a "page" unit of print medium is not limited to a particular size of print medium.

The printing component 106 may receive and/or retrieve the digital representations of a target image from the print queue 108. The printing component 106 may actively print the target image on the print medium according to the digital representations. Active printing may include the above described process of actively picking-up print media from a supply tray, conveying the print medium to a transferring assembly, transferring printing substance to the conveyed print medium, fusing the printing substance to the conveyed print medium, and/or outputting the printed print medium. In doing so, the printing component 106 may deplete the print queue 108 of the digital representations stored therein. For example, upon printing the image specified in the digital representation from the print queue, the corresponding digital representation may be removed from the print queue 108.

Once the printing component 106 is not actively printing, the stress, strain, and/or wear to the printing component 106 caused by continually operating the printing component 106 as described above may be avoided by disengaging the components of the printing component 106. For example, once the printing component 106 had depleted the print queue 108 of digital representations that are awaiting printing and/or once the printing component 106 has gone without a next digital representation to be printed being deposited in the print queue 108, a disengaging cycle may be triggered for the printing component.

In some examples, a disengaging cycle may be referred to as a printer engine spin-down cycle. For example, a charge may be discontinued at and/or dissipated from the charged cylinder. A laser may be powered down to a partial intensity level or switched off. Further, the charged cylinder, rollers, a scanning mirror, etc. may be spun-down or have their movement slowed until they drop below a threshold speed and/or stop moving. Furthermore, heating of the fuser assembly may be reduced or discontinued and/or the heat may be dissipated from the fuser assembly. Once the corresponding reduced charge levels, rotation speeds, and/or temperatures have been achieved, the printing component 106 may be considered to have completed a disengaging cycle. That is, once the operating conditions at the printing component 106 are reduced below their threshold levels associated with active printing and/or to a threshold level associated with an idle state, the printing component 106 may be considered to have completed a disengaging cycle.

As a result, the stress, strain, and/or wear to the printing component 106 caused by sustaining operating conditions at the printing component 106 associated with active printing while not actively printing may be reduced and/or eliminated. The printing component 106 may be unavailable to actively print while the disengagement cycle is executed. That is, the disengaging cycle may place the printing component 106 in an idle state with respect to active printing.

In order to resume printing, a re-engagement cycle may be triggered at the printing component 106. In some examples, an engagement cycle and/or a re-engagement cycle may be referred to as a printer engine spin-up cycle. The re-engagement cycle may include the same or similar steps as were triggered in the engagement cycle. For example, the reduced operating conditions may be increased back to their respective threshold levels associated with active printing. For example, the reduced charge levels, rotation speeds, and/or temperatures may be increased back to the charge levels, rotation speeds, and/or temperatures utilized in actively printing. The printing component 106 may be unavailable to actively print while the re-engagement cycle is being executed until the charge levels, rotation speeds, and/or temperatures involved in actively printing have been achieved. That is, the re-engaging cycle may place the printing component 106 in an idle state with respect to active printing until the operating conditions at the printing component 106 reach their respective thresholds associated with active printing.

As described above, the printing component 106 may print an image according to a digital representation of the image specified in the print queue 108, As also described above, the printing component 106 may deplete the print queue 108 of digital representations as it prints them. That is, the print queue 108 may be supplied with pages of data where each page of data is a digital representation instructing the printing component 106 how to reproduce an image on the print medium. As each page of date is printed by the printing component 106, it may be discarded from the print queue 108. The printing component 106 may continue to print consecutive pages of data from the print queue 108 until the print queue 108 is empty and/or remains empty for a threshold amount of time triggering a disengagement cycle as described above.

The print queue 108 may be supplied with pages of data from devices communicatively coupled to the printing device 102. For example, a computing device may be communicatively coupled to the printing device 102. The computing device may generate and/or may send pages of data to the printing device 102 to be inserted into the print queue 108 and/or printed by the printing component 106.

In some examples, the print queue 108 may be supplied with pages of data generated utilizing other components of the printing device 102. For example, the print queue 108 may be supplied with pages of data from an imaging component 104 of the printing device 102 during an imaging operation.

An imaging component 104 may include an assembly to optically scan and/or capture images of a physical object. For example, the imaging component 104 may include a camera, a scanning device, a flatbed scanner, a sheet-fed scanner, a handheld scanner, a drum scanner, etc. The physical object being imaged may include a document, a photo, a sheet of printed medium, etc. The imaging component 104 may covert the optical inputs collected during the scan to digital representations of an image of the scanned object. That is, the imaging component 104 may generate, from optical input from and/or about the scanned object, a page of data including a digital representation of the scanned object. The imaging component 104 may feed the generated data to the print queue 108 as a page of data to be utilized in printing an image at the printing component 106. As such, the print queue 108 may be supplied from the imaging component 104 with data pages to be printed, while the printing component 106 may simultaneously deplete the data pages from the print queue 108 by printing them.

The imaging component 104 may scan the physical object and/or generate the corresponding page of data digitally representing an image of the object at a first speed and/or rate. As such, the print queue 108 may be supplied with pages of data to be printed at the first speed and/or rate. In some examples, the first speed and/or rate may be referred to as a supply rate with reference to the rate of supply of pages of data to the print queue 108.

The printing component 106 may print on the print medium according to the data pages at a second speed and/or rate. That is, the printing component 106 may deposit printing substance on the print medium according to the data pages. As such, the print queue 108 may be depleted of pages of data by printing at the second speed and/or rate. In some examples, the first speed and/or rate may be referred to as a depletion rate with reference to the depletion of pages of data from the print queue 108.

The second speed and/or rate may be relatively faster than the first speed and/or rate, That is, the printing component 106 may complete a printing operation for a page of data at a higher speed and/or rate than a speed and/or rate at which the imaging component 104 may supply additional pages of data to the print queue 108 to be printed.

The difference between the two speeds and/or rates may, if unchecked, result in a print queue 108 being exhausted (e.g., completely emptied, emptied to a threshold amount, etc.) of pages of data to be printed prior to a completion of a scanning operation, For example, a scanning operation may involve generating ten pages of data by scanning ten objects consecutively. In such examples, the printing component 106 may empty, after a first page of data is supplied by the imaging component 104, the print queue 108 of any pages of data that it contains prior to all of the ten pages of data being generated by the imaging component 104 and/or supplied to the print queue 108. That is, the printing component 106 may run out of data pages to print in the print queue 108 before an entire imaging operation is completed.

As described above, this lack of pages of data to print in the print queue 108 may cause the printing component 106 to stay idle (e.g., awaiting arrival of a next page of data to print) longer than a threshold period of time. This may, as described above, trigger the disengagement cycle, As also described above, this may, if unchecked, lead to the frustrating, delaying, and/or potentially damaging repetitive cycling between the disengagement cycle and/or the re-engagement cycle throughout the duration of the imaging operation that is feeding the printing component 106. That is, the printing component 106 may go through several disengagement cycles and/or re-engagement cycles while printing and/or waiting for additional pages of data from an imaging component 104 imaging multiple objects as part of an imaging operation.

Examples consistent with the present disclosure may address the differing speeds of the imaging component 104 and the printing component 106, by utilizing media feed rate adjustments 110 to address the repetitive cycling between the disengagement cycle and the re-engagement cycle during an imaging operation. For example, by analyzing the print queue 108, a media feed rate adjustment 110 may be determined. The media feed rate adjustment 110 may be an adjustment to the media feed rate of the printing component 106 that addresses the aforementioned consequences of the differing speeds of the imaging component 104 and the printing component 106 as they relate to the supply and depletion of data pages in the print queue 108.

For example, the print queue 108 may be analyzed and/or monitored to determine the contents of the print queue 108, In some examples, the print queue 108 may be analyzed and/or monitored to determine how many pages of data to be printed are presently in the print queue.

In some examples, the print queue may be analyzed to determine a supply rate at which the imaging component 104 is supplying additional pages of data to the print queue 108. Although, in some examples, the supply rate may be determined based on manufacturer specifications rather than actual observation of the print queue 108, In some examples, the print queue 108 may be analyzed to determine a depletion rate at which the printing component 106 is printing pages of data from the print queue 108. Like the supply rate, in some examples, the depletion rate may be determined based on manufacturer specifications rather than actual observation of the print queue 108.

Moreover, the supply rate and the depletion rate may, in some examples, may be determined and or reported by their respective components (e.g., the supply rate by the imaging component 104 and the depletion rate by printing component 106) based on their present operating characteristics or their operational settings, The print queue 108 may be analyzed during an imaging operation being performed by the imaging component 104.

For example, the print queue 108 may be analyzed while the imaging component 104 is scanning physical objects to generate corresponding digital representations as pages of data to be supplied to the print queue 108 for printing by the printing component 106. That is, the print queue 108 may be analyzed prior to the completion of the imaging operation which may be defined by generating a corresponding digital representation for a final physical object being scanned in a scan job, A determination may be made, during an imaging operation by an imaging component 104 of a printing device 102, whether the print queue 108 may be depleted by the printing component 106 during the imaging operation. For example, while an imaging operation is being executed by the imaging component 104, it may be determined whether the print queue 108 will be emptied and/or have its data page contents reduced below a threshold amount of data pages prior to a completion of the imaging operation.

This determination may be based on a plurality of variables. For example, the determination may be based on an amount of data pages in the print queue 108, the amount of data pages in a print queue 108 relative to a threshold amount of pages in the print queue 108, the amount of data pages in a print queue 108 relative to each of a plurality of threshold amounts of pages in the print queue 108, the supply rate at which the imaging component 104 is supplying additional pages of data to the print queue 108, and/or the depletion rate at which the printing component 106 is printing pages of data from the print queue 108.

In an example, a supply rate at which the imaging component 104 is supplying additional pages of data to the print queue 108 may be compared to the depletion rate at which the printing component 106 is depleting the pages of data through printing from the print queue 108 in order to determine whether the print queue 108 will be depleted prior to a completion of an imaging operation by an imaging component 104 of a printing device 102. In some examples, this comparison may be conducted in reference to an amount of data pages present in the print queue 108 waiting to be printed. For example, if the print queue 108 includes one data page, the imaging component 104 is supplying additional pages to the print queue at a rate of one data page every five seconds, and the printing component 106 is depleting the data pages from the print queue 108 at a rate of one data page every two seconds, then it may be determined that the print queue 108 will be depleted prior to the completion of the scanning operation. Again, depletion may refer to a complete emptying of the print queue 108 or, alternatively, a partial emptying to a threshold amount of data pages.

In some examples, a present amount of data pages in the print queue 108 may be compared to threshold amounts to determine whether the print queue 108 will be depleted prior to a completion of an imaging operation by an imaging component 104 of a printing device 102. For example, when an amount of data pages in the print queue 108 falls below a threshold amount of pages, it may be determined that the print queue 108 will be depleted prior to a completion of an imaging operation by an imaging component 104 of a printing device 102.

A media feed rate adjustment 110 may be determined based on the determination of whether the print queue 108 will be depleted prior to a completion of the imaging operation. A media feed rate adjustment 110 may include an adjustment to be applied to a print media feed rate of the printing component 106. For example, a media feed rate adjustment 110 may include a modification to an existing rate at which print medium is fed into, through, and/or out of the printing component 106. As described above, the printing component 106 may include a print medium supply tray where the printing medium is picked up and conveyed into, through, and out of the printing component 106 for printing.

In some examples, the media feed rate adjustment 110 may include a modification to a speed or rate at which the print medium is conveyed into and/or through the printing component 106. For example, the printing component 106 may covey printing medium into, through, and/or out of the printing component 106 at an initial speed or rate. For example, the initial speed or rate may correspond to a fastest operational feed speed setting that results in a relatively lowest first page out time when beginning printing data pages from the print queue 108. The media feed rate adjustment 110 may include a reduction to the initial feed speed or rate to a subsequent feed speed or rate that conveys the subsequent print medium into, through, and/or out of the printing component 106 at a relatively lower speed or rate. For example, rollers that contact and move the print medium through a print medium feed path during printing may have their rotation slowed from an initial speed or rate to a reduced subsequent speed or rate.

In some examples, the media feed rate adjustment 110 may include a modification to a distance of an inter-page gap between consecutive units of print media fed into, through, and/or out of the printing component 106. That is, the inter-page gap may include the distance between the units of print medium whereupon images specified in the pages of data from the print queue 108 may be printed. An inter-page gap may include a distance between consecutive pages being conveyed through a print medium feed path during printing. For example, an inter-page gap may include the distance between a trailing edge of a first page of print medium being conveyed through a print medium feed path during printing and a leading edge of a second page of print medium being conveyed through a print medium feed path during printing, A shortened or decreased inter-page gap may result in an increased rate of printing by the printing component 106 as print medium is delivered through the printing component 106 more frequently. A lengthened or increased inter-page gap may result in a decreased rate of printing by the printing component 106 as the print medium is delivered through the printing component 106 less frequently.

By lengthening the inter-page gap between the conveyed print medium and/or by slowing the conveying speed or rate, the duration of the active printing operation may be extended, That is, the period of time that the printing component 106 takes to generate a printed unit of print medium may be lengthened or prolonged, while still keeping the printing component 106 actively engaged in the printing process (as opposed to prolonging disengaging and/or re-engaging cycles), Therefore, the triggering of engagement cycles, disengagement cycles, re-engagement cycles may be reduced as the printing component 106 is retained in the active printing phase for a longer period of time. As a result, the printing component 106 may deplete pages of data from the print queue 108 at a slower speed as the printing operation by which it consumes them is prolonged by media feed rate adjustments 110. That is, by modulating (increasing, decreasing, changing, etc.) the inter-page gap between the conveyed print medium and/or by modulating the conveying speed or rate of the print medium, the printing speed or rate of the printing component 106 may be correspondingly modulated (increased, decreased, changed, etc.). Such modulations may be utilized to avoid the periods of inactivity at the printing component 106 that may eventually reach a threshold duration and trigger the aforementioned cycles.

Determining the media feed rate adjustment 110 to be applied to the printing component 106 may include calculating a media fee rate adjustment 110. For example, a media feed rate adjustment 110 may be calculated based on a mathematical comparison of the variables (e.g., number of data pages in the print queue 108, supply rate, depletion rate, etc.) determined from analyzing the print queue 108, determined from reporting by the corresponding components of the printing device 102, and/or determined from manufacturer specifications.

For example, a media feed rate adjustment 110 may be determined, based on a mathematical comparison of the variables, that, if applied to the printing component 106, may prevent the triggering of a disengagement cycle of the printing component 106 prior to a completion of the imaging operation by the imaging component 104. For example, a calculation may be performed to determine a media feed rate adjustment 110 that may be applied to the printing component 106 that will prevent the printer engine of the printing component 106 from entering a spin-down cycle, as described above, while the imaging component 104 is still imaging physical objects and supplying corresponding data pages to the print queue 108.

For example, a calculation may be performed to determine a media feed rate adjustment 110 that may be applied to the printing component 106 that will adjust the media feed rate of the printing component 106 to be equal to or less than an imaging speed of the imaging component 104. For example, a media feed rate adjustment 110 may be identified that reduces the printing speed of the printing component 106 and its resulting depletion rate of the print queue 108 to be equal to or less than the imaging speed of the imaging component 106 and its resulting supply rate to the print queue 108, As such, a calculation may be performed to determine a media feed rate adjustment 110 that may be applied to the printing component 106 to establish an equilibrium with result to data page supply and data page deletion at the print queue 108 during the execution of the imaging operation by the imaging component 104.

Determining the media feed rate adjustment 110 to be applied to the printing component may include identifying a media feed rate adjustment 110 corresponding to a data page threshold achieved in the print queue 108. For example, when an amount of data pages awaiting printing within the print queue 108 during an execution of an imaging operation by the imaging component 104 reaches a threshold amount, a corresponding media feed rate adjustment 110 may be identified that, if applied to the printing component 106, may prevent the triggering of a disengagement cycle of the printing component 106 prior to a completion of the imaging operation by the imaging component 104. For example, a corresponding media feed rate adjustment 110 may be identified that may be applied to the printing component 106 that will adjust the media feed rate of the printing component 106 to be equal to or less than an imaging speed of the imaging component 104.

In some examples, a plurality of data page thresholds may be assigned within the print queue 108. Each of the plurality of threshold may correspond to a distinct media feed rate adjustment 110.

For example, the plurality of thresholds may be conceptualized as a plurality of consecutive low-water mark thresholds in the print queue 108 each triggering a distinct corresponding media feed rate adjustment 100. For example, a first data page threshold may be a highest low-water mark threshold, being a higher amount of data pages relative to the other data page thresholds of the plurality of data page thresholds. The first data page threshold amount, when crossed by the amount of data pages in the print queue 108, may correspond to a first media feed rate adjustment 110 which translates to a first reduction in the media feed rate of the printing component 106. That is, the printing speed of the printing component 106 may be slowed by a first increment via the first media feed rate adjustment 110 to respond to the depletion of the data pages in the print queue 108 to the first low-water mark threshold.

A second data page threshold may be a next highest low-water mark threshold. That is, the second data page threshold may be lower in an amount of data pages than the first data page threshold but may be higher in an amount of data pages relative to the remaining plurality of data page thresholds. The second data page threshold amount, when crossed by the amount of data pages in the print queue 108, may correspond to a second media feed rate adjustment which translates to a second reduction in the media feed rate of the printing component 106. The second reduction may be a further reduction to the first reduction. That is the second reduction may be a yet slower media feed rate than the first reduction. That is, the printing speed of the printing component 106 may be slowed by a second increment via the second media feed rate adjustment to respond to the depletion of the data pages in the print queue 108 to the second low-water mark threshold. The second media feed rate adjustment may be a further reduction from the first media feed rate reduction because hitting the second low-water mark threshold may be an indication that the depletion of the print queue 108 is progressing and more aggressive reductions may be indicated to counter act the depletion.

This incremental media feed rate adjustment pattern may extend throughout the remaining plurality of data page thresholds, The data page thresholds may be specified and/or set by a user via a user interface. Alternatively, the data page thresholds may be specified and/or set according to manufacturer specifications. In some examples, the data page threshold may initially be set by the manufacturer specification, but the manufacturer specified thresholds may be modifiable by a user via a user interface.

As described above, the media feed rate adjustment 110 may be an adjustment to the media feed rate of the printing component 106 which may prevent a triggering of a disengagement cycle of the printing component 106 prior to a completion of the imaging operation by the imaging component 104. As also described above, the analysis of the print queue 108 and the determination of the media feed rate adjustment 110 may occur during the execution of the imaging operation by the imaging component 104. Since the supply rate of data pages to the print queue 108 may be a result of the imaging operation by the imaging component 104, the media feed rate adjustment 110 and/or its determination may occur during the execution of the imaging operation 104. For example, the determination and/or application of the media feed rate adjustment 110 may be based on and/or in response to maintaining a data page supply in the print queue 108 that prevents triggering a disengagement cycle during the imaging operation. As such, determination and/or application of the media feed rate adjustment 110 may occur during the imaging operation.

In some examples, an indication of the initiation of an imaging operation and/or the completion of a scanning operation may be signaled by the imaging component 104. For example, a controller portion of the imaging component 104 may transmit a signal indicating that an imaging operation is being commenced and/or a signal indicating that the imaging operation is completed. For example, a controller portion of an imaging component 104 may transmit a data flag indicating that a source of objects to be imaged by the imaging component has been exhausted (e.g., emptied, emptied to a threshold amount, etc.). For example, a controller portion of an imaging component 104 may transmit a data flag indicating that an automatic document feeder portion of the imaging component 104 has no remaining documents in it awaiting imaging by the imaging component 104. Such a data flag may be interpreted by the printing device 102 and/or other components of the printing device 102, such as the printing component 106, as an indication that the imaging operation being completed. The signals from the imaging component 104 may be received and or interpreted by processing resources such as a controller/processor associated with a print queue 108, a controller/processor associated with a printing component 106, a controller/processor associated with a media feed rate adjustment 110 manager, a controller/processor associated with a printing device 102, etc.

Alternatively, a determination as to whether an imaging operation being executed by the imaging component 104 has concluded may be based on when the previous data page was supplied to the print queue 108 from the imaging component 104. For example, it may be determined that an imaging operation has concluded once a threshold period of time has elapsed since a previous data page was supplied to the print queue 108 by the imaging component.

As described above, the media feed rate of the printing component 106 may be adjusted based on the determination of whether the print queue 108 will be depleted (e.g., beyond a threshold amount of data pages) by the printing component 106 prior to a completion of the imaging operation. For example, if it is determined that the print queue 108 will be depleted, then a media feed rate adjustment 110 may be determined for and/or applied to the printing component 106.

Adjusting the media feed rate may include applying the media feed rate adjustment 110 to modify the initial media feed rate of the printing component 106 according to the determined media feed rate adjustment 110. For example, the initial media feed rate may be a first rate or speed at which print medium is conveyed through the printing component 106 while executing a printing operation.

The initial media feed rate may be a relatively fastest media feed rate for the printing component 106 which results in the relatively shortest amount of time to execute a printing operation within the confines of the present settings of the printing device 102 and/or printing component 106. The initial media feed rate may be a feed rate or speed that, when utilized at the printing component 106 during the execution of the printing operation, will result in the depletion of data pages from the print queue 108 beyond a threshold amount and/or will result in a depletion rate from the print queue 108 that is faster than a supply rate to the print queue 108. For example, the initial media feed rate may be a feed rate or speed that, when utilized at the printing component 106 during the execution of the printing operation, will result in the triggering of a disengagement cycle at the printing component 106 prior to a completion of the imaging operation.

Adjusting the media feed rate may include applying the media feed rate adjustment 110 to modify the initial media feed rate to a modified media feed rate according to the determined media feed rate adjustment 110. The modified media feed rate may be a relatively slower media feed rate than the initial media feed rate. As such, operating the printing component with the modified media feed rate may result in a relatively longer amount of time to execute a printing operation as compared to operating it at the initial media feed rate.

The modified media feed rate may be a feed rate that, when utilized at the printing component 106 during the execution of the printing operation, will result in a reduction in a depletion rate of data pages from the print queue 108. In some examples, the reduction in the depletion rate may reduce and/or eliminate the instances of the amount of data pages in the print queue 108 being depleted beyond a threshold amount prior to a completion of the imaging operation, As such, the reduction in the depletion rate may eliminate and/or reduce the frequency of the triggering of a disengagement cycle at the printing component 106 prior to a completion of the imaging operation.

For example, the modified media feed rate may be a feed rate that, when utilized at the printing component 106 during the execution of the printing operation, may adjust the media feed rate of the printing component 106 to be equal to or less than an imaging speed of the imaging component 104 prior to a completion of the imaging operation.

In some examples, the above described incremental media feed rate adjustment pattern associated with a plurality of data page thresholds in the print queue 108 may each correspond to an incremental adjustment to a subsequent media feed rate of the printing component 106. As such, each incremental adjustment may be applied to affect a corresponding incremental reduction or increase over a previous media feed rate prior to a completion of the imaging operation.

Adjusting the media feed rate of the printing component 106 may include modifying, according to the media feed rate adjustment 110, a speed or rate at which a print medium conveying assembly of the printing component 106 is operating. For example, the rotation speed of print medium conveying rollers that deliver print medium to, through, and/or out of the printing component 106 and/or its printing substance transfer assembly may be modified to create a corresponding modification to the printing speed and/or a data page depletion rate. By increasing the rotating speed of the conveying roller, an overall printing speed of the printing component 106 may be increased. As a result, a depletion rate and instances of disengaging cycles being triggered may be increased in instances where the imaging component 104 is imaging at a slower rate than a printing component 106 is printing.

Conversely, by decreasing the rotating speed of the conveying roller, an overall printing speed of the printing component 106 may be decreased. As a result, a depletion rate and instances of disengaging cycles being triggered may be decreased in instances where the imaging component 104 is imaging at a slower rate than a printing component 106 is printing.

Adjusting the media feed rate of the printing component 106 may include modifying an inter-page gap between consecutively fed units of print medium according to the media feed rate adjustment 110. For example, the operating speed of an assembly that picks up a next unit of print medium to be conveyed may be modified to modify the inter-page gap between consecutively fed units of print medium at the printing component 106. For example, a grabbing mechanism of the printing component that grabs a next unit of print medium from the supply tray to be fed into and conveyed through the printing component 106 may have its operating speed modified to modify a frequency with which it grabs a next unit of print medium from the supply tray.

By picking up a next unit of print medium with an increased frequency, the inter-page gap may be reduced and an overall printing speed of the printing component 106 may be increased. As a result, a depletion rate and instances of disengaging cycles being triggered may be increased when the imaging component 104 is imaging at a slower rate than a printing component 106 is printing.

Conversely, by picking up a next unit of print medium with a decreased frequency, the inter-page gap may be increased and an overall printing speed of the printing component 106 may be decreased. As a result, a depletion rate and instances of disengaging cycles being triggered may be decreased when the imaging component 104 is imaging at a slower rate than a printing component 106 is printing.

Once the imaging operation has been completed by the imaging component 104, the media feed rate of the printing component 106 may be modified again. For example, once a data flag has been detected indicating that an automatic document feeder tray of the imaging component 104 is empty and/or once a threshold period of time has elapsed since a previous data page was supplied to the print queue 108 by the imaging component 104, the media feed rate at the printing component 106 may be modified. For example, the existing media feed rate may be modified to a media feed rate that will provide the fastest printing speed within the confines of the present settings of the printing component 106 and/or printing device 102. For example, the existing media feed rate may be modified back to the initial feed rate for the duration of the printing operation (e.g., for printing the remaining data pages in the print queue 108).

In adjusting the media feed rate of the printing component 106 to avoid triggering disengagement cycles at the printing component, some increased non-productive stress, strain, and/or wear may be introduced to the printing component 106. That is, by increasing a printing time while decreasing a printing rate at the printing component, potentially wearing and/or damaging operating conditions may be sustained at the printing component 106 for longer periods of time in order to prolong the printing process.

In some examples, as described in greater detail below, the increased amount of wear experienced by the printing component may be monitored and/or factored in when determining a media feed rate adjustment 110 and/or in producing additional media feed rate adjustments to counter said wear. That is, the media feed rate adjustment 110 may be further adjusted and/or additional media feed rate adjustments may be generated based on an amount of wear detected or predicted at the printing component 106.

Figure 2:
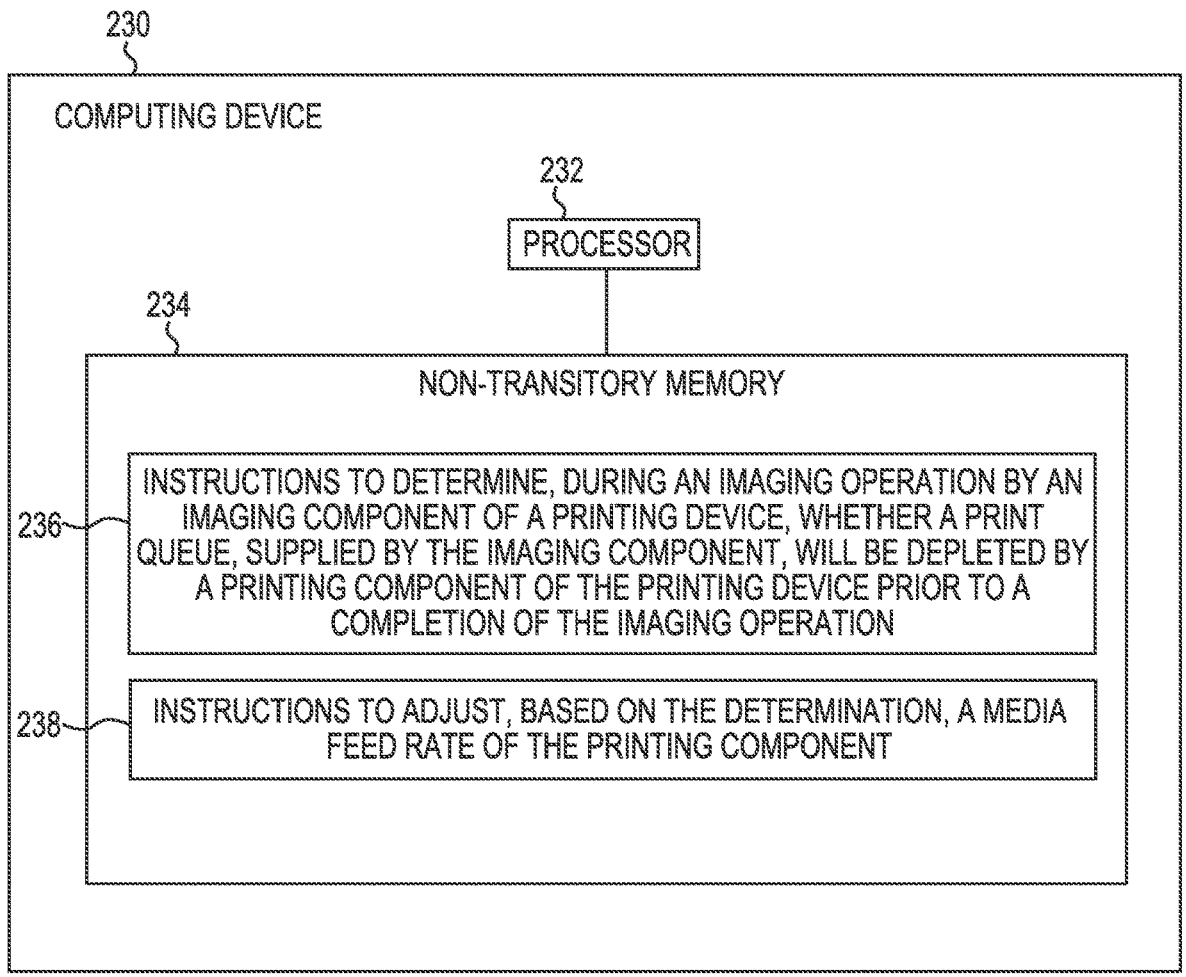
FIG. 2 illustrates an example of a computing device for media feed rate adjustments consistent with the present disclosure.

FIG. 2 illustrates an example of a computing device 230 for media feed rate adjustments consistent with the present disclosure. The described components and/or operations described with respect to the computing device 230 may include and/or be interchanged with the described components and/or operations described in relation to FIG. 1 and FIG. 3-FIG. 4.

The computing device 230 may be a printing device. For example, the computing device 230 may be an inkjet printer, a laser printer, a three-dimensional (3D) printer, etc. The computing device 230 may be a multi-function printing device including a plurality of components to perform a variety of functionalities (e.g., printing, faxing, imaging, copying, etc.). The computing device 230 may be a controller of a printing device and/or a component of a printing device. The computing device 230 may be a computing device communicatively coupled to and/or controlling a printing device.

The computing device 230 may include a processor 232 and/or a non-transitory memory 234. The non-transitory memory 234 may include instructions (e.g., 236, 238, etc.) that, when executed by the processor 232, cause the computing device 230 and/or a printing device controlled thereby to perform various operations described herein. While the computing device 230 is illustrated as a single component, it is contemplated that the computing device 230 may be distributed among and/or inclusive of a plurality of such components.

The computing device 230 may include instructions 236 executable by the processor 232 to determine, during an imaging operation by an imaging component of a printing device, whether a print queue, supplied by the imaging component, will be depleted by a printing component of the printing device prior to a completion of the imaging operation. For example, an imaging component of the printing device may image physical objects in order to produce digital representations of the objects that may be utilized to print an image of the object. The imaging component may supply the digital representations to a print queue as a page of data.

A printing component may print a copy of the image of the imaged object on to print medium utilizing the corresponding page of data from the print queue as instructions. The printing component may deplete the print queue of pages of data as it prints them. That is, a page of data may be removed from the print queue once it has been printed or is being printed by the printing component.

A determination as to whether the print queue will be depleted may include an indication of whether the print queue will be completely emptied by the printing component prior to a completion of an imaging operation. A determination as to whether the print queue will be depleted may include an indication of whether the print queue will be emptied to below a threshold amount of pages of data by the printing component prior to a completion of an imaging operation. A determination as the whether the print queue will be depleted may include an indication of whether the print queue will be emptied to below a threshold amount of pages of data by the printing component for a threshold period of time corresponding to a period of time that would trigger a disengaging cycle at the printing component prior to a completion of an imaging operation.

The determination of whether the print queue will be depleted by the printing component prior to a completion of the imaging operation may be made based on a comparison of a supply rate at which the imaging component is supplying additional pages of data to the print queue and a depletion rate at which the printing component is printing pages of data from the print queue. Additionally, the determination of whether the print queue will be depleted by the printing component prior to a completion of the imaging operation may be made based on an amount of data pages in the print queue. In some examples, the determination of whether the print queue will be depleted by the printing component prior to a completion of the imaging operation may be made based on the amount of data pages in the print queue relative to a threshold amount of data pages and/or a plurality of threshold amounts of data. For example, when an amount of data pages in the print queue reaches a threshold amount it may be determined that the print queue will be depleted by the printing component prior to a completion of the imaging operation.

The computing device 230 may include instructions 236 executable by the processor 232 to adjust, based on the determination of whether the print queue will be depleted by the printing component prior to a completion of the imaging operation, a media feed rate of the printing component. Adjusting the media feed rate of the printing component may include modifying an initial media feed rate of the printing component. An initial media feed rate of the printing component may be a feed rate that corresponds to a data page depletion rate at a print queue that is greater than a data page supply rate at the print queue from the imaging component.

Since, at the beginning of a printing operation the printing component may be unavailable to print due to having to complete an engagement cycle, the amount of data pages supplied by the imaging device may build up in the print queue prior to the printing component beginning to deplete them through printing. As such, the initial printing speed/data page depletion rate of the printing component being faster than an imaging speed/data supply rate of the imaging component may not have an immediate consequence of triggering a disengagement cycle as the printing component has some data pages in the print queue to work through. However, if the initial printing speed/data page depletion rate of the printing component is greater than the imaging speed/data supply rate of the imaging component, then the print queue may be depleted unless an adjustment is made to the initial printing speed/data page depletion rate of the printing component.

As such, the media feed rate of the printing component may be adjusted in order to modify the initial printing speed/data page depletion rate relative to the imaging speed/data supply rate of the imaging component. Adjusting the media feed rate may include modifying a distance of an inter-page gap between print media utilized by the printing component to print the data pages from the print queue. In some examples, adjusting the media feed rate of the printing component may include modifying the media feed rate to be equal to or less than an imaging speed of the imaging component. That is, adjusting the media feed rate of the printing component may include modifying the media feed rate to print pages of data from the print queue at a slower speed or at approximately the same speed as the pages of data are generated by and/or supplied to the print queue by the imaging component. In some examples, the adjustment to the media feed rate may include an adjustment that prevents a triggering of a disengagement cycle of the printing component prior to a completion of the imaging operation by the imaging component.

Figure 3:
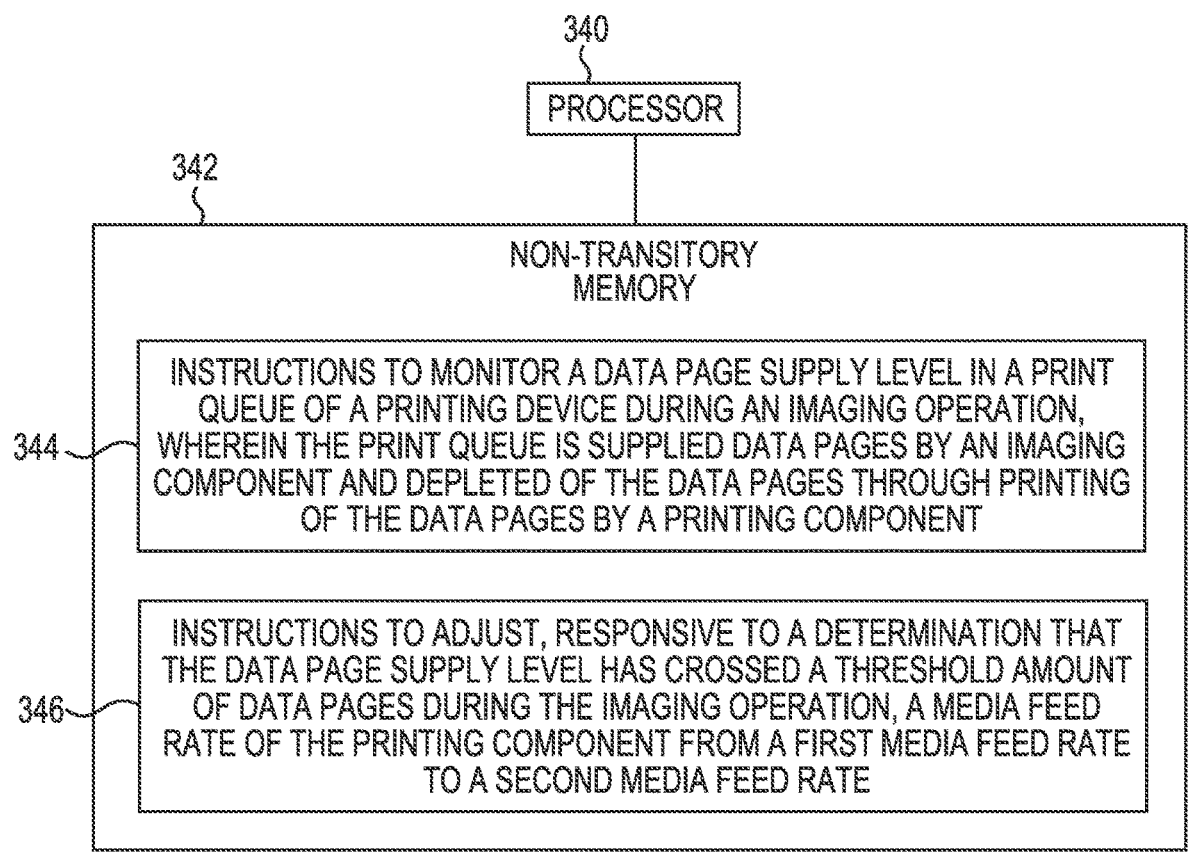
FIG. 3 illustrates an example of a non-transitory machine-readable memory and processor for media feed rate adjustments consistent with the present disclosure.

FIG. 3 illustrates an example of a non-transitory machine-readable memory 342 and processor 340 for media feed rate adjustments consistent with the present disclosure. A memory resource, such as the non-transitory machine-readable memory 342, may be utilized to store instructions (e.g., 344, 346, etc.). The instructions may be executed by the processor 340 to perform the operations as described herein. The operations are not limited to a particular example described herein and may include and/or be interchanged with the described components and/or operations described in relation to FIG. 1- FIG. 2 and FIG. 4.

The non-transitory memory 342 may store instructions 344 executable by the processor 340 to monitor a data page supply level in a print queue of a printing device during an imaging operation, Monitoring a data page supply level may include monitoring an amount of data pages in a print queue awaiting printing by the printing component.

The data pages may be supplied by an imaging component of the printing device, That is, the imaging component of the printing device may image physical objects and convert the image to a digital representation of the object to be inserted into the print queue as a data page.

The data pages may be depleted from the print queue by a printing component of the printing device. That is, a printing component may deplete the data pages from the print queue through printing an image on print medium according to the data in the data page. After and/or during the printing of the image on the print medium, the corresponding data page may be removed from the print queue.

Monitoring the data page supply level in the print queue may include monitoring the amount of data pages in a print queue awaiting printing by the printing component relative to a threshold amount of data pages. For example, monitoring the data page supply level may include determining whether the data page supply level has crossed a threshold amount of data pages. The threshold amount of data pages may be one of a plurality of threshold amounts of data pages. Each threshold amount of data pages may correspond to a level and/or rate of depletion of the print queue. Each threshold amount of data pages may correspond to a likelihood that a disengagement cycle may be triggered at the printing component responsive to a threshold period of time elapsing without the printing component being supplied, via the print queue, with a next data page to print.

The non-transitory memory 342 may store instructions 346 executable by the processor 340 to adjust a media feed rate of the printing component. The adjustment to the media feed rate of the printing component may be made responsive to a determination that the data page supply level in the print queue has crossed a threshold amount of data pages during the imaging operation.

For example, responsive to a determination that the data page supply level in the print queue has crossed a first threshold amount of data pages, the media feed rate of the printing component may be adjusted from a first media feed rate to a second media feed rate. In some examples, the first threshold may be an elevated threshold indicating that the data page supply in the print queue has increased to an extent that the printing speed of the printing component may be adjusted, via a media feed rate adjustment, upward without an immediate risk of depleting the print queue data page supply during the imaging operation. In such examples, the media feed rate of the printing component may be adjusted from a first media feed rate to a second media feed rate that is greater than the first media print rate.

In some examples, adjusting the first media feed rate to a second media feed rate may include adjusting the first media feed rate to a second media feed rate that is pace-matched to an imaging speed of the imaging component. For example, the second media feed rate may correspond to a rate of feeding printing medium to, through, and/or out of a printing component during a printing operation that results in the duration of the printing operation matching the duration of the imaging component on a data page by data page basis. That is, the second media feed rate may result in a data page depletion rate by printing via the printing component that approximately matches a data page supply rate by imaging via the imaging component.

In some examples, the first threshold may be a lower threshold indicating that the data page supply in the print queue has been depleted through printing to an extent that the data page supply in the print queue is at risk of being depleted through printing during the imaging operation, In such examples, the media feed rate of the printing component may be adjusted from a first media print rate to a second media print rate that is less than the first media print rate.

Additionally, it may be determined that the data page supply level in the print queue has crossed a second threshold amount of data pages during the imaging operation. The second threshold amount of data pages may be relatively higher or relatively lower than the first threshold amount of data pages.

Responsive to a determination that the second threshold amount of data pages has been crossed by the data page supply amount in the print queue, the media feed rate may be further adjusted. For example, the second media feed rate described above may be adjusted to a third media feed rate, The third media feed rate may be a media feed rate that is faster or slower than the second media feed rate. For example, if the second threshold amount of data pages crossed by the data page supply level is even more elevated than the first threshold level, corresponding to an elevated threshold, then the third media feed rate may be even greater than the second media feed rate. Conversely, if the second threshold amount of data pages crossed by the data page supply level is even lower than the first threshold level, corresponding to a lower threshold, then the third media feed rate may be even less than the second media feed rate.

Alternatively, if the second threshold amount of data pages crossed by the data page supply level is lower than the first threshold level, corresponding to an elevated threshold, then the third media feed rate may be less than the second media feed rate. Likewise, if the second threshold amount of data pages crossed by the data page supply level is higher than the first threshold level, corresponding to a lower threshold, then the third media feed rate may be greater than the second media feed rate, In this manner, the media feed rate at the printing component may be fine-tuned in a granular and responsive fashion to the data page supply level and the print queue and/or momentary fluctuations thereof.

Further, a determination may be made that the imaging operation by the imaging component of the printing device has completed. An imaging operation may be completed when the imaging component reaches the end of a run of physical objects to be imaged. For example, in examples where the imaging operation includes scanning a stack of documents feed to the imaging component via an automatic document feeder, the imaging operation may be considered to be completed upon imaging the last document in the stack of documents. That is, the imaging operation may be considered to be completed once the automatic document feeder is empty. As such, in some examples, a determination may be made that the imaging operation has been completed when a particular flag is detected. For example, once a final page of an automatic document feeder tray is fed into the imaging component and/or when a sensor detects that an automatic document feeder tray is empty the imaging component may transmit a flag indicating that its automatic document feeder is empty. Detection of this flag by a printing device and/or a printing device component may suffice as a determination that that imaging operation has completed.

Responsive to a determination that the imaging operation by the imaging component has been completed, an additional adjustment to the media feed rate may be made. In examples where the first media feed rate has been adjusted to the second media feed rate, responsive to a determination that the imaging operation by the imaging component has been completed, the second media feed rate may be adjusted back to the first media feed rate. The first media feed rate, as described above, may be greater than the second media feed rate. As also described above, the media feed rates may be adjusted by modifying an inter-page gap between print medium at the printing component. A smaller inter-page gap may correspond to a greater media feed rate. Therefore, in some examples, the first media feed rate may correspond to a smaller inter-page gap between consecutive units of print medium being printed at the printing component than the second media feed rate. This adjustment may be equivalent to turning the printing speed/data page depletion rate of the printing component back up to full speed from a lower speed responsive to an indication that, since the imaging operation has been completed, the print queue will not be prematurely (e.g., prior to completion of the imaging operation) depleted triggering s disengagement cycle that will be followed by a re-engagement cycle to finish printing subsequent data pages of the printing operation.

Figure 4:
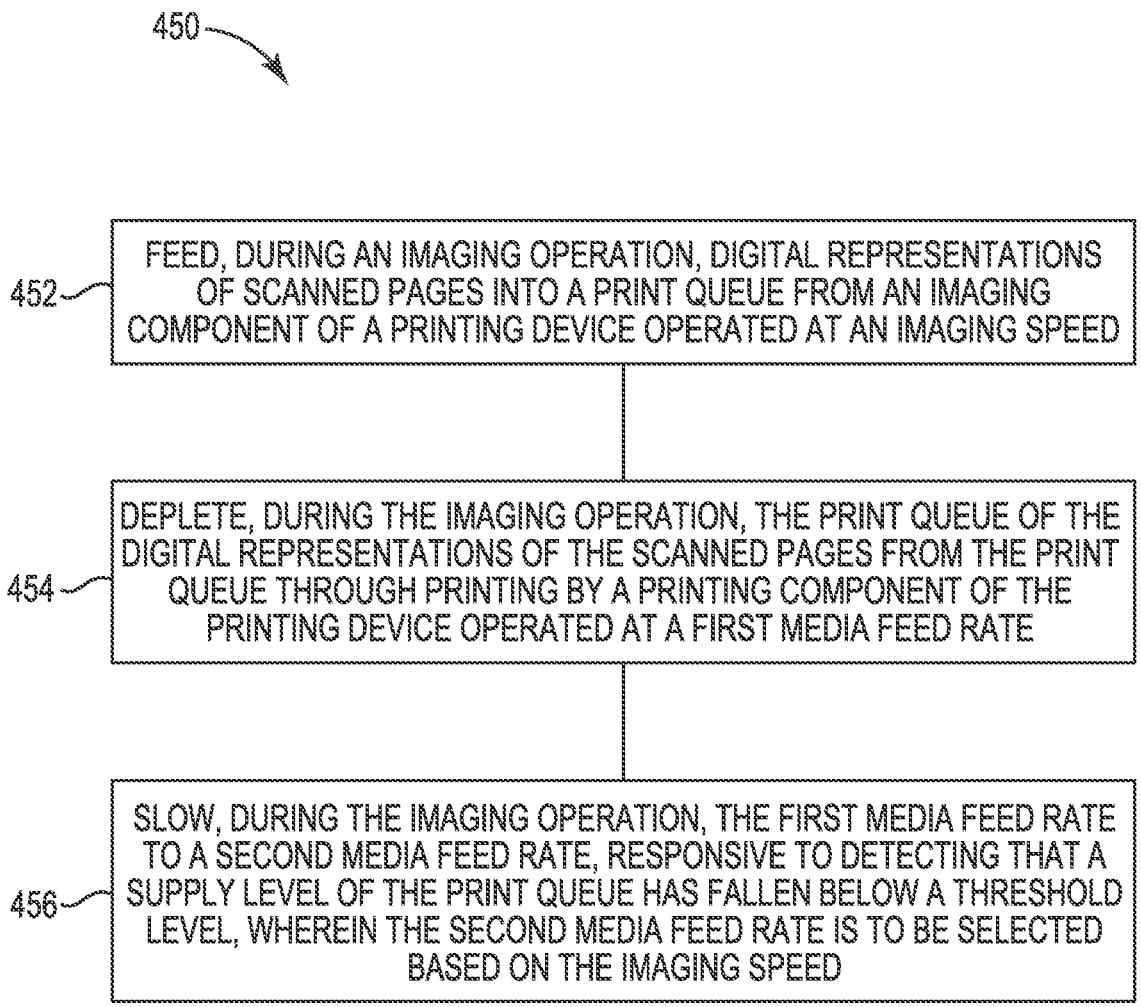
FIG. 4 illustrates an example of a method for media feed rate adjustments consistent with the present disclosure.

FIG. 4 illustrates an example of a method 450 for media feed rate adjustments consistent with the present disclosure. The described components and/or operations of method 450 may include and/or be interchanged with the described components and/or operations described in relation to FIG. 1-FIG. 3.

At 452, the method 450 may include feeding, during a scanning operation, digital representations of scanned pages into a print queue. The digital representations may be generated by and fed from an imaging component, such as a scanner component, of a printing device. The imaging component may be operated at a particular imaging speed. That is, the digital representations of the scanned pages may be generated by and/or fed to a print queue from the imaging component at a particular rate.

At 454, the method 450 may include depleting, during the imaging operation, the print queue of the digital representations of the scanned pages into a print queue. For example, the digital representations of the scanned pages supplied to the print queue by the imaging component may be depleted from the print queue through printing by a printing component. That is, each time a printing component prints an image specified by a digital representation of a scanned page that corresponding digital representation of the scanned page may be removed from the print queue.

The printing component of the printing device may be operated at a first media feed rate. For example, the print medium that the printing component is printing the images, specified by the digital representations of the scanned pages, on may be feed to, through, and/or out of the printing component at a first media feed rate. In some examples, the first media feed rate may be a relatively fastest media feed rate for the printing component resulting in the relatively shortest amount of time to execute a printing operation within the confines of the present settings of the printing device and/or printing component.

At 456, the method 450 may include slowing, during the imaging operation, the first media feed rate to a second media feed rate. The first media feed rate may be slowed to a second media feed rate responsive to detecting that a supply level of the print queue has fallen below a threshold level. That is, responsive to detecting that an amount of digital representations of the scanned pages has fallen below a threshold amount, the first media feed rate may be reduced to a second media feed rate.

Slowing the first media feed rate to a second media feed rate may include reducing the operating speed of print medium pick up and conveying mechanisms at the printing component. For example, reducing the first media feed rate to the second media feed rate may include reducing a rotation speed of print medium conveying rollers of the printing component. In some examples, reducing the first media feed rate to a second media feed rate may include increasing an inter-page gap between consecutively conveyed units of print medium. The reduced second media feed rate may be achieved by adjusting a delay before the printing component picks up a next unit of print medium to be utilized for printing. For example, by increasing the inter-page gap through extending the delay before a printing component picks up a next unit of print medium to be utilized for printing, the media feed rate may be reduced.

The second media feed rate may be selected based on analysis of a variety of variables. For example, the second media feed rate may be selected based on the imaging speed. For example, a second media feed rate may be selected that is pace-matched to the imaging speed, is slower than the imaging speed, is a media feed rate that will not deplete the print queue during the imaging operation at the imaging speed, etc..

In some examples, a targeted media feed rate may be indicated by the imaging speed. For example, based on an imaging speed, a targeted media feed rate may be indicated that will pace-match the imaging speed and/or cause the printing rate of the printing component to be reduced to an extent that a disengaging cycle will not be triggered during the imaging operations. However, as indicated above, reducing the printing rate by prolonging the printing time through a lower media feed rate may generate additional wear at the printing component.

As such, the second media feed rate may be selected based additionally on a predicted amount of wear at the printing component at various media feed rates. For example, the printing device may be programmed with predetermined knowledge (e.g., manufacturer specifications) of the predicted amount of wear to the printing component at various media feed rates and/or across various amounts of time. In some examples, a media feed rate that comes as close to a targeted media feed rate while still generating an amount of predicted wear that is under an acceptable threshold amount of wear may be selected as the second media feed rate.

In some examples, the acceptable threshold amount of wear may be selected based on an indication received at a user interface from a user of the printing device. For example, the user interface may provide a user with a mechanism to specify a printing device behavior tolerance. For example, the user interface may provide a user with a mechanism to specify on a continuum of options the user's tolerance for wear at the printing component. As such, acceptable threshold amounts of wear initially specified by manufacturer specifications may be adjusted to the specifications of the user delivered over the user interface.

In some examples, the actual wear being experienced by the printing component may be monitored. For example, the rotations, electrical charge, temperature, etc. and/or its effects on the printing component may be monitored as the printing component executes a printing operation. For example, the printing component may be monitored utilizing various sensors monitoring the various assemblies of the printing component. Based on this monitoring, it may be determined when the printing component is close to crossing or has crossed an acceptable threshold amount of wear. Based on this determination, the media feed rate may be adjusted in order to reduce the amount of wear being experienced by the printing component.

For example, an amount of wear at the printing component may be monitored while the printing component is operated at the second media feed rate. Based on the monitored amount of wear at the printing component crossing an acceptable threshold amount of wear, the second media feed rate may be adjusted to a third media feed rate.

The third media feed rate may be greater than the second media feed rate. For example, if the printing component is experiencing greater than an acceptable threshold amount of wear while the active printing time is being prolonged through a lower media feed rate, then the second media feed rate may be increased to a third media feed rate. The third media feed rate may be a media feed rate determined to deplete the print queue of the digital representations such that the printing component will be starved of additional digital representations from the print queue for a period of time sufficient to trigger a disengagement cycle and reduce wear.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure. Further, as used herein, "a plurality of" an element and/or feature can refer to more than one of such elements and/or features.

The figures herein follow a numbering convention in which the first digit corresponds to the drawing figure number and the remaining digits identify an element or component in the drawing. Elements shown in the various figures herein may be capable of being added, exchanged, and/or eliminated so as to provide a number of additional examples of the disclosure. In addition, the proportion and the relative scale of the elements provided in the figures are intended to illustrate the examples of the disclosure and should not be taken in a limiting sense.

What is claimed:

1. A system, comprising:
  a processor; and
  a non-transitory machine-readable storage medium to store instructions executable by the processor to:
    determine, during an imaging operation by an imaging component of a printing device, when a print queue, supplied by the imaging component, will be depleted by a printing component of the printing device prior to a completion of the imaging operation; and
    adjust a media feed rate of the printing component during the imaging operation in response to the determination.

2. The system of claim 1, including instructions to adjust the media feed rate by modifying a distance of an inter-page gap between print media utilized by the printing component to print data pages from the print queue.

3. The system of claim 1, including instructions to adjust the media feed rate to be equal to or less than an imaging speed of the imaging component.

4. The system of claim 1, including instructions to determine when the print queue will be depleted based on comparison of a supply rate at which the imaging component is supplying additional pages of data to the print queue and a depletion rate at which the printing component is printing pages of data from the print queue.

5. The system of claim 1, including instructions to adjust the media feed rate to the printing component to a media feed rate that prevents a triggering of a disengagement cycle of the printing component prior to a completion of the imaging operation.

6. A non-transitory machine-readable storage medium comprising instructions executable by a processor to:
  monitor a data page supply level in a print queue of a printing device during an imaging operation, wherein the print queue is supplied data pages by an imaging component and depleted of the data pages through printing of the data pages by a printing component; and
  adjust, responsive to a determination that the data page supply level has crossed a threshold amount of data pages during the imaging operation, a media feed rate of the printing component from a first media feed rate to a second media feed rate during the imaging operation.

7. The non-transitory machine-readable storage medium of claim 6, including instructions executable by the processor to:
  determine that the data page supply level in the print queue has crossed a second threshold amount of data pages; and
  adjust, responsive to the determination that the second threshold amount of data pages has been crossed, the second media feed rate to a third media feed rate.

8. The non-transitory machine-readable storage medium of claim 6, including instructions executable by the processor to adjust, responsive to a determination that the imaging operation by the imaging component has completed, the second media feed rate back to the first media feed rate, wherein the first media feed rate corresponds to a smaller inter-page gap at the printing component than the second media feed rate.

9. The non-transitory machine-readable storage medium of claim 8, including instructions executable by the processor to determine that the imaging operation by the imaging component has completed by detecting a flag indicating that an automatic document feeder of the imaging component is empty.

10. The non-transitory machine-readable storage medium of claim 6, wherein the second media feed rate is pace matched to an imaging speed of the imaging component.

11. A method, comprising:
  feeding, during an imaging operation, digital representations of scanned pages into a print queue from an imaging component of a printing device operated at an imaging speed;
  depleting, during the imaging operation, the print queue of the digital representations of the scanned pages from the print queue through printing by a printing component of the printing device operated at a first media feed rate; and
  slowing, during the imaging operation, the first media feed rate to a second media feed rate, responsive to detecting that a supply level of the print queue has fallen below a threshold level, wherein the second media feed rate is to be selected based on the imaging speed.

12. The method of claim 11, including:
  monitoring an amount of wear at the printing component as the printing component is operated at the second media feed rate; and
  adjusting, based on the monitored amount of wear at the printing component crossing a threshold amount of wear, the second media feed rate to a third media feed rate.

13. The method of claim 11, including selecting the second media feed rate based additionally on a predicted amount of wear at the printing component at various media feed rates.

14. The method of claim 11, including selecting the second media feed rate based additionally on an indication received at a user interface specifying a printing device behavior tolerance of a user.

15. The method of claim 11, including adjusting a delay before the printing component picks up a next sheet of print media to be utilized for printing to achieve the second media feed rate.

\* \* \* \* \*